United States Patent [19]

Hess

[11] 4,372,784
[45] Feb. 8, 1983

[54] METHOD FOR HEAT TREATING PULVEROUS RAW MATERIAL CALCINING COMBUSTOR THEREFOR

[75] Inventor: Paul D. Hess, Brookfield, Wis.

[73] Assignee: Allis-Chalmers Corporation, Milwaukee, Wis.

[21] Appl. No.: 295,218

[22] Filed: Aug. 21, 1981

[51] Int. Cl.$^3$ .................. C04B 7/02; F27B 15/00; F27B 7/02
[52] U.S. Cl. .................................. 106/100; 432/14; 432/58; 432/106
[58] Field of Search .............. 432/14, 58, 106; 106/100

[56] References Cited

U.S. PATENT DOCUMENTS

| | | | |
|---|---|---|---|
| 1,468,168 | 9/1923 | Pike | 432/106 |
| 3,869,248 | 3/1975 | Hirai et al. | 432/58 |
| 3,938,949 | 2/1976 | Christiansen | 432/106 |
| 4,059,393 | 11/1977 | Kobayashi | 432/106 |
| 4,071,310 | 1/1978 | Ghestem | 432/106 |

*Primary Examiner*—John J. Camby
*Attorney, Agent, or Firm*—Lee H. Kaiser

[57] ABSTRACT

A calcining combustor for the suspension preheater of a rotary kiln cement manufacturing plant having a cooler for the clinker comprises an upright furnace vessel having an outwardly spiraling gas exhaust duct at its upper end leading to a preheater gas/meal separator and a mixing portion at its lower end; an inlet for hot combustion air from the cooler into the mixing portion; an inlet for cement meal from the preheater into the mixing portion downstream from the combustion air inlet to entrain the meal in the rising combustion air; and burners for injecting fuel into the air/meal stream downstream from the meal inlet to calcine the meal by heat released by burning of the fuel with the combustion air. The initial calcination temperature is a minimum because the combustion air atmosphere within the combustor is devoid of significant amounts of carbon dioxide and chlorine and alkali vapors typically present in kiln-off gases, and the endothermic calcination reaction absorbs heat energy to limit temperature rise within the combustor so that caking and formation of alkali and nitrogen oxide vapors is minimized. An alternative embodiment has an inlet for hot kiln-off gases into the furnace vessel at a point where substantial calcination has occurred so that both (a) calcining and (b) mixing of the calcined meal/air stream with the kiln-off gases to transfer heat energy thereto occur in a single vessel.

22 Claims, 6 Drawing Figures

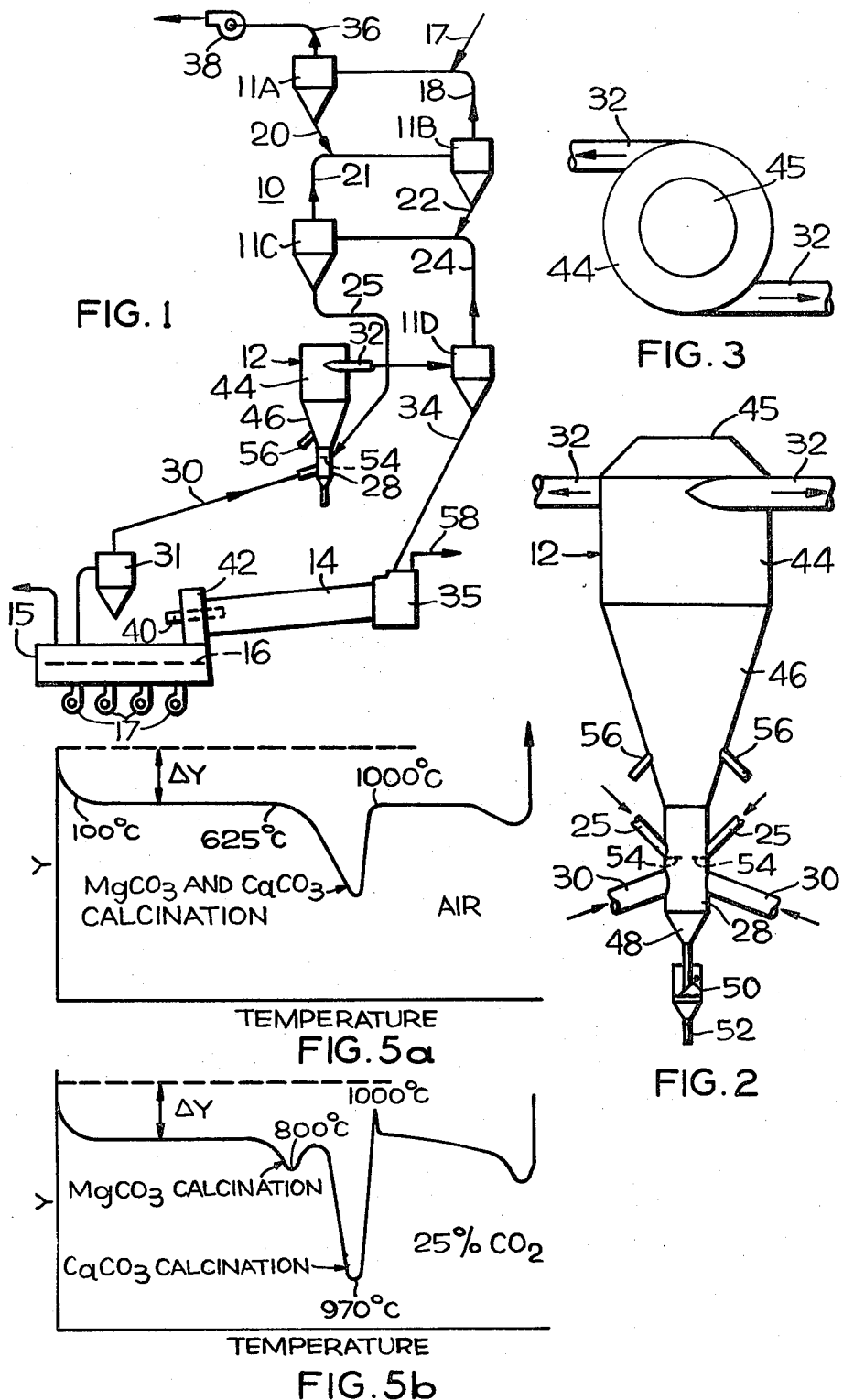

METHOD FOR HEAT TREATING PULVEROUS RAW MATERIAL CALCINING COMBUSTOR THEREFOR

BACKGROUND OF THE INVENTION

1. Field of the Invention

This invention relates to a method and apparatus for calcining a pulverous raw material.

2. Description of the Prior Art

Various methods and apparatus are utilized for heat treatment of pulverous raw material such as cement meal, dolomite and limestone. Calcination of cement meal requires the driving off of carbon dioxide ($CO_2$) from calcium carbonate ($CaCO_3$) by the endothermic process $CaCO_3 \rightarrow CaO + CO_2$. The heat necessary to calcine and to clinker cement raw meal is usually obtained by burning fuel together with combustion air in a combustion chamber such as a rotary kiln.

In present day rotary kiln cement manufacturing plants, heat treatment of raw cement meal to accomplish evaporation of uncombined water, dehydration of clay, calcination of $MgCO_3$, and substantial calcination of $CaCO_3$ are carried out in a preheater having an auxiliary furnace, or calcining combustor separate from the kiln so that the size of the kiln may be reduced. Such a preheater may be termed a "precalcining" preheater because traditionally final calcination of the cement meal was carried out in the kiln.

The final heat treatment following calcination in the auxiliary furnace is a heating and sintering process by which cement clinker is produced in the rotary kiln. The clinker is discharged from the kiln onto the grate of a cooler through which air is blown to cool the clinker. The preheater usually has a plurality of stages of solids/gas separators, such as cyclone separators, plus the calcining combustor stage. The cement raw meal is initially fed into the uppermost separator stage and flows downwardly by gravity serially through the separators to the calcining combustor where fuel is burned together with combustion air at approximately 900° C. to release heat energy which, together with hot waste gases from the kiln and/or hot recoup gases from the cooler, calcine the cement raw meal. The hot gases and entrained calcined meal discharged from the calcining combustor are separated in a cyclone separator and the meal flows downward by gravity to the kiln while the hot gases rise upwardly through the preceding separator stages countercurrent to the cement raw meal to preheat the raw meal. Fuel is simultaneously burned with combustion air in the rotary kiln to form a separate source of heat to achieve the relatively high temperature of approximately 1400° C. and above necessary for clinkering. The vapor pressure of $CO_2$ in a calcining combustor which receives kiln-off, or kiln waste gases raises the temperature at which calcination of raw cement meal is initiated and retards the calcination of the meal.

The following table gives the values of the pressure of $CO_2$ corresponding to various temperatures:

| Dissociation Pressures of $CaCO_3$ | |
|---|---|
| Temperature, Degrees C. | Pressure in Atmospheres |
| 500 | 0.000096 |
| 600 | 0.00242 |
| 700 | 0.0292 |
| 800 | 0.220 |
| 897 | 1.000 |
| 1,000 | 3.871 |
| 1,100 | 11.499 |
| 1,200 | 28.680 |

The sources of carbon dioxide in a calcining combustor include the $CO_2$ driven off from the meal in the combustor itself and that driven off from the meal in the kiln plus the $CO_2$ present in the products of combustion of the fuel burned in the combustor and in the kiln.

A risk exists of excessively heating the raw cement meal in the calcining combustor. Temperatures of 900°–1000° C. are necessary for complete calcination of the meal, whereas clinkering occurs in the kiln at temperatures in the range of 1400° C. and above, and burning of fuel in combustion air only can reach temperatures well in excess of 1600° C. Subjection of the meal for even short periods of time to excessive temperatures can cause caking within the calcining combustor; vaporize alkali and chlorine contents in the cement meal; and produce noxious nitrogen oxides which contaminate the atmosphere into which they are discharged. When the temperature within the burning zone in the calcining combustor or in the kiln is above approximately 1100° C., the alkalies and chlorine materials in the meal are vaporized. The quantity of nitrogen oxides formed increases exponentially when the temperature rises above approximately 1200° C. Also sulfur in the fuel is vaporized when the fuel is burned in the combustor and in the kiln. When the temperature drops to less than 800°–900° C., the vaporized materials condense and adhere to the walls and block the gas inlet passage to the combustor or to the succeeding cyclone. when the vaporized alkali, sulfur and chlorine materials enter the preheater, they condense on the cement meal when the temperature drops to 800°–900° C. and flow downwardly with the cement meal into the kiln where they are re-volatilized and are thus contained in kiln waste gases introduced into the calcining combustor. The alkali, chlorine and sulfur material may be recirculated several times through the kiln and the preheater and build up to a concentration several times greater than their original percentages. Such alkali, chlorine, sulfur and nitrogen oxide vapors present in the calcining combustor retard the calcination of the cement meal. Further, the chlorine vapors discharged into the atmosphere may mix with water and form hydrochloric acid which creates an environmental pollution problem.

Calcining combustors of the upright, cylindrical furnace body vessel type for calcining cement raw meal separate from the rotary kiln are disclosed in such prior art U.S. Pat. Nos. as 3,869,248; 3,891,382 and 4,059,393. In certain prior art cement plants, combustion air in the form of waste gases from the kiln and recoup air from the cooler are mixed and introduced into the lower end of the calcining combustor with a swirling motion by means of a volute chamber; raw meal is fed into the combustion chamber; fuel is injected into the combustion chamber and burned with the combustion air to release heat energy to calcine the meal; and the calcined meal entrained in the upwardly swirling hot combustion gases is discharged from exhaust ducts into a cyclone separator of the preheater. In certain such prior art calcining combustors fuel is injected into combustion gases mixed with air and burns to release heat energy at a point upstream from the meal feed inlet, and such burning of combustion air and fuel within the calcining combustor can reach temperatures in excess of 1600° C. and form an extremely high temperature zone which may excessively heat the meal; cause caking within the combustor; vaporize the alkali and chlorine contents of the meal; form noxious nitrogen oxides, and require use of inordinate thickness of refractory material in the walls of the calcining furnace. In other prior art calcining combustors combustion air from the cooler is mixed with the kiln-off waste gases in the calcining furnace, or before entering the furnace, and the presence of this gas impedes and delays the combustion process. Also the waste kiln-off gases will contain a high level of $CO_2$ driven off from the meal in the kiln and from coal fired in the kiln which will raise the initial calcining temperature of $CaCO_3$ as much as 200° C. The kiln-off gases contain volatile chlorine and alkali vapors that may be condensed and form coatings on the pulverized particles that further inhibit calcination and will also coat the calcinator walls adjacent its gas inlet passage, all of which are undesirable.

SUMMARY OF THE INVENTION

A calcining combustor for pulverous raw material in accordance with the invention comprises an upright furnace vessel having a mixing portion at its lower end; an inlet for combustion air into the mixing portion; means including a gas exhaust duct adjacent the top wall of the vessel for causing the combustion air to flow upwardly in the vessel from the air inlet to the exhaust duct; an inlet for pulverous raw material into the mixing portion downstream in the direction of air flow from the combustion air inlet; whereby the raw material is entrained in the rising combustion air; and means for injecting fuel into the combustion air/material stream within said vessel downstream from the meal inlet and for burning the fuel with the combustion air to thereby release heat energy to calcine the pulverous raw material in an endothermic reaction that limits temperature rise within the furnace vessel.

When the calcining combustor of the invention is utilized in the suspension preheater of a rotary kiln cement manufacturing plant having a cooler for cement clinker, hot recoup air from the cooler is fed to the combustion air inlet; preheated cement meal from the second lowermost cyclone separator stage of the preheater is fed to the raw material inlet; and the gas exhaust duct discharges the calcined meal/air stream in a spirally outward direction through the gas exhaust duct into the lowermost separator stage of the preheater which separates the meal from the hot gases and discharges the calcined meal into the rotary kiln while the hot gases flow upwardly serially through the preheater separator stages in countercurrent relation to the cement meal descending by gravity to thereby preheat the meal. The initial calcination temperature is minimum because the combustion air is devoid of significant amounts of carbon dioxide and chlorine and alkali vapors typically present in kiln-off gases, and the endothermic calcination reaction absorbs heat energy released by burning of the fuel with the combustion air to thereby limit the temperature rise within the vessel so that caking and formation of alkali, chlorine and nitrogen oxide vapors is minimized.

An alternative embodiment of my calcining combustor accomplishes calcination of the cement meal and subsequent mixing of the calcined meal/air stream with hot kiln-off gases in a single vessel to thereby capture heat energy from the kiln-off gases for preheating the raw cement meal in the suspension preheater. In such embodiment the furnace vessel has an inlet for hot kiln-off gases downstream from the fuel burners and at a point where substantial calcination of the cement meal has occurred so that the kiln-off gases mix with the calcined meal/air stream within the same vessel and the resulting mixture is discharged through the gas exhaust duct into the lowermost separator stage of the preheater. Inasmuch as kiln-off gases are not utilized as a source of combustion air, the lower end of the calcining combustor vessel can be disposed below the fuel firing level in the kiln, thereby permitting the height of the suspension preheater tower to be reduced significantly.

The method of my invention for heat treating cement raw meal in an upright calcining combustion vessel of a rotary kiln cement plant comprises feeding hot combustion air from the cooler into the lower end of the vessel and simultaneously withdrawing the air from adjacent the top of the vessel to create upward flow of combustion air within the vessel; directing preheated cement meal into the rising combustion air within the vessel at a point downstream from the combustion air inlet so that the meal is entrained in the combustion air stream; and injecting fuel into the air/meal stream within the vessel downstream from the entrance of meal and burning the fuel with the combustion air to release heat energy to calcine the meal, whereby the endothermic reaction of calcining the cement meal limits the temperature rise within the vessel. An alternative method includes introducing hot waste gases from the kiln into the vessel at a point downstream from injection of the fuel and where substantial calcination has occurred to thereby mix the waste gases with, and transfer the heat energy thereof to, the calcined meal/gas stream within the vessel.

BRIEF DESCRIPTION OF THE DRAWINGS

The objects and advantages of the invention will be more readily apparent from consideration of the attached drawing wherein:

FIG. 1 is a schematic representation of a rotary kiln cement manufacturing plant embodying the calcining combustor of the invention;

FIG. 2 is a front view of the calcining combustor shown in FIG. 1;

FIG. 3 is a top view of the combustor shown in FIG. 2;

FIGS. 5a and 5b are thermal diagrams of cement raw meal versus temperature for respectively; (a) a combustion air atmosphere and (b) a combustion air atmosphere containing 25% carbon dioxide.

DESCRIPTION OF THE PREFERRED EMBODIMENTS

Figure 4:
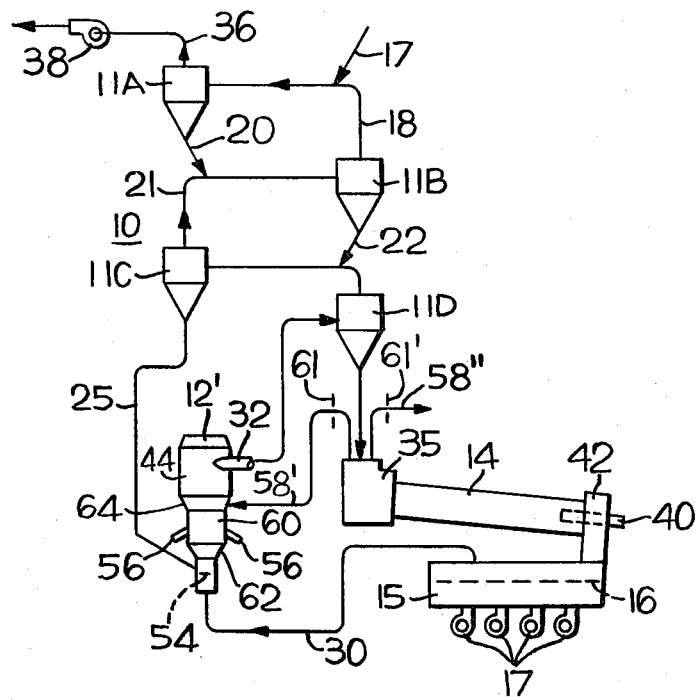
FIG. 4 is a schematic representation of an alternative embodiment of the invention wherein cement meal is calcined and the calcined meal/air stream is mixed with hot kiln-off gases in a single vessel to recover waste gas heat in the preheater and to control the recirculation levels of sulfur, alkali and chlorine.

FIG. 1 schematically illustrates a rotary kiln cement manufacturing plant having a suspension preheater 10 which includes four stages of vertically spaced apart separators 11A, 11B, 11C and 11D which may be of the cyclone type or of the helical duct type disclosed in my copending application Ser. No. 222,034 filed Jan. 2, 1980, now U.S. Pat. No. 4,381,692, serially connected with an auxiliary furnace, or calcining combustor 12 embodying my invention, an inclined rotary kiln 14, and a clinker cooler 15. An initial feed inlet 17 for raw cement meal is provided in the gas outlet duct 18 from cyclone separator 11B, which duct is also the inlet for cyclone separator 11A, and the raw meal is entrained in the hot gases rising within duct 18 so that heat energy in the hot gases is transferred to the meal. The meal separated from the gases in separator 11A flows downward by gravity through a meal discharge duct 20 from separator 11A which registers with the gas outlet duct 21 from separator 11C, which duct also is the inlet for separator 11B, so that the meal from 11A is entrained in the hot gases from 11C. The meal discharged from separator 11B flows downward by gravity through a meal discharge duct 22 which registers with the gas outlet duct 24 from lowermost separator 11D which duct also forms the inlet for separator 11C. Preheated cement meal discharged from separator 11C flows downward by gravity through a meal feed duct 25 into the mixing pipe portion 28 of calcining combustor 12 wherein, as described hereinafter, the preheated meal is entrained in hot combustion air, or recoup air, from cooler 15 introduced into mixing pipe portion 28 through a combustion air duct 30 which is positioned upstream in the direction of combustion air flow from meal feed duct 25 and may include a dust collector 31 for removal of clinker dust from the hot combustion air. The preheated combustion air is drawn upwardly through vessel 12, preferably with an outwardly swirling motion, by an induced draft fan 38. The meal is suspended in the rising combustion air within mixing pipe 28 and is calcined in frustoconical intermediate portion 46 and enlarged diameter cylindrical upper portion 44 by heat energy released by burning fuel, injected into the gas/meal stream at a point downstream from meal duct 25, with the hot combustion air. The hot gases flow with an upwardly swirling motion through combustor 12, and the gases with calcined meal therein are discharged from combustor 12 through a spirally outward, or tangentially directed exhaust gas duct 32 into the inlet for the lowermost cyclone separator 11D. The calcined meal separated in 11D flows downward by gravity through a duct 34 and is charged into a kiln inlet chamber 35, while the hot gases from separator 11D are drawn upwardly by induced draft fan 38 and flow upward through gas outlet duct 24 and separator stages 11C, 11B, and 11A sequentially in countercurrent flow to the descending raw meal and are finally discharged from separator 11A through an exhaust duct 36.

The calcined meal from separator 11D is charged into rotary kiln 14 through duct 34 and kiln inlet chamber 35 and is further heated and clinkered by heat released from combustion of fuel injected into kiln 14 through a burner 40 provided on a kiln hood 42. The burnt clinker formed in kiln 14 is discharged onto a grate 16 in a cooler 15 and cooled by air blown by fans 17 through cooler 15. The waste hot gases from kiln 14 may be exhausted from inlet chamber 34 through a 100% by-pass duct 58.

The hot recoup air from cooler 15 is introduced into the lowermost portion of tubular mixing pipe portion 28 of combustor 12 and rises through the mixing pipe 28. Such cooler combustion air may be at approximately 700° C. to 1000° C. and will not contain the carbon dioxide and alkali, chlorine and sulfur vapors and noxious nitrogen oxides which are formed in kiln 14 and are typically present in waste gases from a kiln. The meal charged from separator 11C into mixing pipe portion 28 is preheated in separator stages 11A, 11B and 11C to approximately 700°-800° C. before it is introduced into combustor 12 and is preferably directed downward through meal inlet duct 25 against splash plates 54 at a point downstream in the direction of gas flow from the combustion air inlet 30 so that the preheated meal is dispersed and entrained and carried with the rising combustion air.

As best shown in FIG. 2, calcining combustor 12 preferably comprises an upright furnace body vessel having an elongated cylindrical upper portion 44 with its axis vertical; a closed top 45; diametrically opposed spirally outward, or tangentially directed gas exhaust ducts 32 from upper portion 44 adjacent closed top 45; an inverted frustoconical intermediate portion 46 disposed below upper portion 44 and formed by an inwardly inclined annular wall; tubular mixing pipe portion 28 disposed below and registering with the open smaller diameter end of frustoconical intermediate portion 46; a frustoconical dropout box 48 disposed below mixing pipe 28; a meal valve 50 which normally closes dropout box 48; and a meal drain pipe 52 disposed below dropout box 48.

The preheated meal is introduced directly into mixing pipe 28 through meal feed duct 25 which is directed downward toward splash plate 54 disposed within mixing pipe 28 which disperses the preheated meal into the hot combustion air that rises rapidly within mixing pipe 28 and carries the meal into frustoconical lower portion 46. Such entrainment of meal in rising hot gases is more efficient than prior art calciners which introduce the preheated meal into the combustion gas duct with the undesirable result that a significant amount of the meal falls into the dropout box of such prior art calciners. Substantially complete calcining of the preheated raw meal is accomplished within frustoconical intermediate portion 46 and cylindrical upper portion 44 by heat energy released by burning of fuel injected by burners 56 into the air-meal stream at a point upstream from meal inlet 25 for combustion and release of heat which is transferred directly to the suspended meal for heat exchange and calcining. The relatively small diameter of mixing pipe 28 assures entrainment of the meal in the combustion air, and the velocity of the air/meal stream decreases as it flows upwardly and outwardly in the relatively larger diameter intermediate portion 46 to assure longer residence time for calcination of the meal.

Kiln-off gases fed into calcining combustors of prior art rotary kiln cement manufacturing plants typically contained a high percentage of carbon dioxide as a result of calcination of raw meal and from burning of coal as a fuel and also contained significant percentages of chlorine, sulfur, alkali and nitrogen oxide vapors caused by volatilization of such materials in the cement meal at high temperatures. The relatively high carbon dioxide pressure and the presence of the alkali, chlorine, sulfur and nitrogen oxide vapors in the kiln-off gases retarded the calcination of cement meal in the calcining combustor of such prior art plants and raised the initial calcination temperature as much as 200° C. FIGS. 5a and 5b are thermal diagrams of cement meal versus temperature for a combustion air atmosphere and for an atmosphere containing 25% $CO_2$. In these diagrams $\Delta y$ represents specific heat. It will be noted from FIG. 5a that the endothermic reaction of calcination of cement meal in the combustion air atmosphere is initiated at approximately 625° C., whereas FIG. 5b illustrates that the endothermic calcination of the $MgCo_3$ in the cement meal in the 25% $CO_2$ atmosphere is initiated at a temperature above 625° C. and that calcination of $CaCO_3$ in the cement meal is initiated at a temperature above approximately 800° C.

A plurality of burners 56 may be disposed on the annular wall of frustoconical intermediate portion 46 at a point downstream in the direction of gas flow from meal inlet duct 25. Burning of the fuel with the combustion air in the absence of $CO_2$ and other gases typically present in kiln-off gas releases heat energy which calcines the preheated meal suspended in the combustion air in an endothermic process having minimum calcination initiation temperature. The meal entrained in the combustion air absorbs heat energy and prevents excessive heat rise within combustor 12 and forms a uniform temperature zone in the range of 800°–1000° C. required for controlled calcination within combustor 12. The degree of calcination is selectively controlled by regulating the amount of fuel burned in combustor 12. No excessively high temperature zone is formed within combustor 12 as sometimes occurs in prior art calcining furnaces when density of meal feed is low adjacent to the burner flame and temperatures can exceed 1600° C. Consequently caking is minimized within combustor 12, formation of nitrogen oxides and alkali, sulfur and chlorine vapors is prevented in the calcining zone, and use of exceptionally thick refractory insulating material in the walls of combustor furnace 12 is obviated. The fuel burns rapidly in oxygen-rich air and immediately and directly transfers the heat released to the entrained pulverized material.

Frustoconical intermediate portion 46 expands upwardly and merges into enlarged cylindrical upper portion 44 having opposed, outwardly spiraling, or tangentially directed exhaust ducts 32 adjacent top wall 45 that cause upwardly and outwardly whorling motion of the air/meal stream within combustor 12. The swirling air expands substantially before leaving exhaust ducts 32 as the fuel injected into the gas/meal stream burns with the combustion air having meal suspended therein to release heat energy and calcine the meal. Such upward and outward motion of the air/meal stream results in a lower velocity, longer residence time flow conditions of the gas/meal stream within inverted frustoconical intermediate portion 46 and enlarged diameter cylindrical portion 44 to thereby assure complete fuel combustion, heat transfer and pyro-process reactions within combustor 12. The relatively low velocity of the air/meal stream within upper cylindrical portion 44 may cause some of the meal to settle along the side walls and fall into the inverted frustoconical portion 46 where the meal is again suspended in the upwardly flowing air stream and recirculated. The combined whorling and recirculating flow of the air/meal stream increases residence time within the larger diameter cyclindrical upper portion 44 to assure complete burning of the fuel and effectively reduces the height of combustor 12 in comparison to a straight high velocity pipe for equivalent combustion time. The temperature rise of the air stream is controlled by the endothermic calcining process so that the temperature of the gases discharged from exhaust ducts 32 is approximately 800°–900° C. It will be appreciated that the disclosed method of injecting fuel into the hot air stream having preheated meal suspended therein is the ideal method of transferring heat by burning of fuel with the combustion air to the meal particles because the highest thermal efficiency may be attained thereby.

Since kiln-off gases are not introduced into calcining combustor 12, the lower end of calcining combustor 12 can be at a height below burner 40 of kiln 14, thereby permitting a substantial reduction in the height of suspension preheater 10 (although this is not illustrated in FIG. 1).

Although FIG. 1 discloses only a single cooler recoup air duct 30 to combustor 12, a single preheated meal feed duct 25 to mixing pipe 28, a single burner 56 and a single exhaust duct 32 from upper portion 44, it will be appreciated that a plurality of such members may be provided as shown in FIG. 2.

Dropout box 48, meal valve 50 and meal pipe 52 are provided to prevent buildup of cement meal at the bottom of mixing pipe portion 28 in the event of unbalanced air/meal flow condition such as might occur during shutdown. The elevation of dropout box 48 can be below kiln 14 as the material falling through is minimal, thereby permitting reduced preheater tower height and permitting combustor 12 and the fuel supply equipment to be closer to ground level.

FIG. 1 shows a rotary kiln cement plant wherein 100% of the kiln waste gases is bypassed because of high levels of sulfur, alkali, chlorine and/or nitrogen oxides in the kiln-off gas. FIG. 4 represents an alternative embodiment of the invention wherein calcination of cement meal and subsequent mixing of calcined meal/air stream with controlled amounts of kiln-off gases is accomplished in a single vessel to recover heat energy from the kiln-off gas in the preheater and to control the recirculation levels of alkali and chlorine.

A controlled portion of hot kiln waste gases is discharged from chamber 35 into a kiln-off gas feed duct 58' which registers with combustor furnace vessel 12' downstream from fuel burners 56 at a point where substantially complete calcination of the cement meal has occurred. A selected portion of the kiln-off gases may be diverted to a bypass duct 58''. The percentage of kiln-off gases flowing in feed duct 58' and in bypass duct 58'' respectively may be controlled by dampers therein schematically represented at 61' and 61''. Calcining combustor 12' has an inverted frustoconical portion 62 positioned above tubular mixing pipe portion 28 and which registers with a cylindrical intermediate portion 60. A plurality of burners 56 are provided on the walls of intermediate portion 60 downstream from meal inlet duct 25 so that the fuel is combusted with recoup cooler air within intermediate portion 60 to permit substantially complete calcination of preheated cement meal entrained in the recoup cooler air to be carried out in cylindrical intermediate portion 60.

Combustor 12' also has an inverted frustoconical portion 64 disposed above intermediate portion 60 and which registers at its lower end with intermediate portion 60 and at its upper end with upper portion 44. Kiln-off gas feed duct 58' registers with frustoconical portion 64 so that kiln waste gases, which may be at approximately 1000° C., are introduced into upper portion 44 above burners 56 to mix with and transfer heat to the calcined meal/air stream before the resulting mixture is exhausted through ducts 32 to separator 11D for preheating of the descending cement meal. Combustion air duct 30 directs hot recoup air from clinker cooler 15 in an axial direction into the bottom end of mixing pipe portion 28 so that it rises and is drawn upward therein by induced draft fan 38. Preheated meal feed duct 25 directs preheated meal from separator 11C against a splash plate 54 disposed within mixing pipe 28 to disperse the preheated meal into the rising combustion air from cooler 15 at a point downstream from the combustion air inlet 30 and upstream from burners 56. The relatively small diameter of mixing pipe portion 28 assures entrainment of the preheated meal in the rising recoup air, while the larger diameter intermediate portion 60 slows the velocity of the recoup meal/air stream and provides greater time for calcination of the meal within intermediate portion 60. Burning of the fuel with the recoup air in the absence of $CO_2$ and other gases typically present in kiln-off gases releases heat energy for calcining of the cement meal in an endothermic process having minimum calcination initiation temperature. The meal entrained in the recoup air absorbs heat energy and prevents excessive heat rise within intermediate portion 60 and forms a uniform temperature zone in the range of 800°–1000° C. required for controlled calcination within combustion vessel 12'. No excessively high temperature zone is formed within intermediate portion 60 and consequently caking is minimized and formation of alkali, chlorine, sulfur and nitrogen oxide vapors is minimized. The hot kiln-off gases can be introduced in controlled amounts into vessel 12 through duct 58' after substantially complete calcination of the cement meal to add the heat energy of the kiln-off gases to the calcined meal/air stream so the heat energy is available to preheat the cement meal in the preheater.

FIG. 4 represents that mixing portion 28 and intermediate portion 60 of combustor vessel 12' are below the level of burner 40 which injects fuel into kiln 14, thereby permitting reduction in height of the preheater tower. It will be appreciated that the recirculation levels of alkali and chlorine will be relatively low in calcining combustor 12' because the alkali and chlorine vapors formed in kiln 14 are not recirculated through the intermediate portion 60 of combustor 12 in which substantially complete calcination of the cement meal occurs.

The embodiments of the invention in which an exclusive property or privilege is claimed are defined as follows:

1. A calcining combustor for raw pulverous material comprising, in combination, an upright furnace vessel having a cylindrical upper portion with its axis vertical and a closed top and a mixing portion adjacent its lower end and an intermediate portion between said upper and mixing portions of smaller diameter than said upper portion, an inlet for combustion air into said mixing portion, means including a tangentially directed gas exhaust duct spiraling outwardly from said upper portion adjacent said closed top for causing said combustion air introduced through said inlet to flow with upwardly swirling motion through said intermediate portion of said vessel toward said gas exhaust duct, an inlet for said raw pulverous material into said mixing portion downstream in the direction of air flow from said combustion air inlet, whereby said pulverous material falls into and is entrained in said rising combustion air, said mixing portion being of smaller diameter than said intermediate portion to assure that said raw pulverous material is entrained in said upwardly rising combustion air and that the velocity of the combustion air/meal stream decreases to provide longer residence time as it flows through said intermediate portion, and fuel burner means for injecting fuel into the combustion air/material stream within said intermediate portion at a point downstream from said material inlet and for burning said fuel with said combustion air, whereby said pulverous raw material is calcined by heat released by burning of said fuel with combustion air in an endothermic reaction that limits temperature rise within said vessel.

2. A calcining combustor in accordance with claim 1 wherein said mixing portion is cylindrical and said combustion air inlet communicates with the lower end of said mixing portion.

3. A calcining combustor in accordance with claim 1 wherein said upper portion has diametrically opposed outwardly spiraling gas exhaust ducts adjacent said closed top which create upwardly swirling flow of said combustion air/material stream within said interior portion.

4. A calcining combustor in accordance with claim 5 wherein said intermediate portion is of inverted frusto-conical configuration and communicates at its opposite ends with said mixing portion and with said upper portion.

5. A calcining combustor in accordance with any one of claims 1, 2, 3, or 4 wherein said means for causing said combustion air to flow upwardly through said vessel includes an induced draft fan connected to said gas exhaust duct.

6. A calcining combustor in accordance with any one of claims 1, 2, 3 or 4 for a rotary kiln cement plant and including an inlet into said furnace vessel for waste gases from the kiln located downstream from said fuel injecting means at a point above said intermediate portion and where substantially complete calcination of said material has occurred to permit mixing and transfer of heat energy from said waste gases to the calcined material/air stream without retardation of calcination which would be caused by the carbon dioxide in said waste gases.

7. A calcining combustor in accordance with claim 6 having damper means for selectively controlling the amount of waste gases introduced through said kiln waste gas inlet into said furnace vessel.

8. A calcining combustor in accordance with any one of claims 1, 2, 3, or 4 for the suspension preheater of a rotary kiln cement manufacturing plant having a cooler for clinker from the kiln and serially connected solids/gas separators at varying heights, wherein said combustion air inlet is connected by a duct to said cooler, said raw material inlet is connected by a duct to the meal discharge opening of a separator of said preheater, and said gas discharge duct is connected to the inlet of the lowermost separator of said preheater.

9. A calcining combustor for a cement manufacturing plant having a rotary kiln and a cooler for clinker from said kiln comprising an upright furnace vessel having a cylindrical upper portion with its axis vertical and a closed top and a mixing portion at its lower end, an inlet for heated combustion air from said cooler into said mixing portion, said furnace vessel also having an intermediate portion between said upper and mixing portions of smaller diameter than said upper portion and means including a tangentially directed gas exhaust duct spiraling outwardly from said upper portion for causing said combustion air to flow with upwardly swirling motion through said intermediate portion toward said gas exhaust duct, an inlet for cement meal into said mixing portion downstream from said combustion air inlet, whereby cement meal falls into and is entrained in combustion air rising upwardly from said combustion air inlet toward said gas exhaust duct, fuel burner means for injecting fuel into the combustion air/meal stream within said intermediate portion at a point downstream from said meal inlet and for burning said fuel with said combustion air, whereby said meal is calcined by heat released by burning of said fuel with said combustion air in an endothermic reaction within said intermediate portion that limits temperature rise within said vessel, and an inlet into said furnace vessel for hot waste gases from said kiln at a point downstream from said fuel injecting means and above said intermediate portion where substantially complete calcination of said cement meal has occurred, whereby calcining of cement meal in a combustion air atmosphere and mixing the calcined meal/air stream with kiln-off gases occur in the same vessel without retardation of calcination which would otherwise be caused by the carbon dioxide in said kiln waste gases.

10. A calcining combustor for the preheater of a cement manufacturing plant having a rotary kiln and a cooler for clinker from said kiln comprising, in combination, an upright furnace vessel having a cylindrical upper portion with its axis vertical and a closed top and a mixing portion adjacent its lower end, an inlet for heated combustion air from said cooler into said mixing portion, means including diametrically opposed, tangentially directed gas exhaust ducts spiraling outwardly from said upper portion adjacent said closed top for causing said heated combustion air introduced through said inlet to flow with upwardly swirling motion through said vessel toward such gas exhaust duct, an inlet for cement meal into said mixing portion downstream in the direction of air flow from said combustion air inlet, whereby said meal falls into and is entrained in said rising heated combustion air, said vessel having an intermediate portion between said upper and mixing portions of larger diameter than said mixing portion to decrease the velocity of the air/meal stream and provide longer residence time for calcination of meal within said intermediate portion, and means for injecting fuel into the combustion air/meal stream within said intermediate portion at a point downstream from said meal inlet and for burning said fuel with said combustion air, whereby said meal is calcined by heat released by burning of said fuel with said combustion air in an endothermic reaction that limits temperature rise within said vessel.

11. A calcining combustor in accordance with claim 10 and including an inlet into said vessel for waste gases from said kiln at a point above said intermediate portion and downstream from said fuel injecting means where substantially complete calcination of said meal has occurred to permit mixing and transfer of heat energy from said waste gases to the calcined meal/air stream to occur within said vessel without retardation of calcination which would otherwise be caused by carbon dioxide in said waste gases.

12. A calcining combustor in accordance with claim 11 wherein said waste kiln gas inlet is located approximately at the junction between said intermediate portion and said upper portion to permit mixing and transfer within said upper portion of heat energy from said waste gases to the calcined meal/air stream.

13. A calcining combustor in accordance with claim 10 wherein said intermediate portion is of inverted frustoconical configuration.

14. A calcining combustor in accordance with claim 10 wherein said means for causing said combustion air to flow upwardly through said vessel includes an induced draft fan connected to said gas exhaust ducts.

15. A calcining combustor for the suspension preheater of a cement manufacturing plant having a rotary kiln, a cooler for clinker discharged from said kiln, and a plurality of meal/gas separators at varying heights serially connected with said combustor and said kiln so that meal is discharged from the lowermost separator into said kiln and gas exhausted therefrom rises serially through the remaining separators to preheat cement meal descending therethrough by gravity comprising, in combination, an upright furnace body vessel having a cylindrical upper portion with its axis vertical and a closed top and a mixing portion adjacent its lower end, a combustion air inlet into said mixing portion connected by a duct to said cooler, diametrically opposed, tangentially directed gas exhaust ducts spiraling outwardly from said upper portion adjacent said closed top and connected to the inlet to said lowermost separator, a fan for causing combustion air introduced into said mixing portion through said inlet to rise within said vessel and flow upward serially through said separators, a cement meal inlet into said mixing portion connected by a duct to the meal outlet of the lowermost separator and positioned downstream in the direction of air flow from said combustion air inlet, whereby cement meal falls into and is entrained in the rising heated combustion air within said vessel, said furnace body vessel also having an intermediate portion between said upper and mixing portions of larger diameter than said mixing portion to decrease the velocity of the air/meal stream and provide a longer residence time within said intermediate portion, and means protruding through a wall of said intermediate portion for injecting fuel into the combustion air/meal stream within said vessel at a point downstream from said meal inlet and for burning said fuel with said combustion air, whereby said meal is calcined by heat released by burning of said fuel wih said combustion air in an endothermic reaction that limits the temperature rise within said vessel.

16. A calcining combustor in accordance with claim 15 and including a kiln waste gas inlet into said furnace body vessel at a point downstream from said fuel injecting means and above said intermediate portion where substantially complete calcination of said meal has occurred and connected by a duct to said rotary kiln to thereby mix kiln waste gases with, and transfer the heat energy of kiln waste gases to, the calcined meal/air stream within said upper portion without retardation of calcination which would otherwise be caused by carbon dioxide in said waste gases.

17. A calcining combustor in accordance with claim 15 wherein said mixing portion of said calcining combustor is positioned below the axis of said kiln to thereby permit reduction in the height of said suspension preheater.

18. A calcining combustor in accordance with claim 9, 11 or 16 having damper means for selectively controlling the amount of kiln waste gas introduced through said kiln waste gas inlet into said furnace vessel.

19. A method of heat treating cement raw meal in an upright calcining combustor vessel of a rotary kiln cement manufacturing plant having a cooler for clinker from the kiln comprising:

feeding combustion air from said cooler which is not admixed with waste gases from said kiln into the lower portion of said vessel and simultaneously withdrawing gas in a tangential, outwardly spiraling direction from adjacent the top of said vessel to create upwardly swirling flow of said combustion air within said vessel, directing said cement meal into said rising combustion air within said lower portion of said vessel at a point downstream from the combustion air inlet so that said meal is entrained in said rising combustion air, injecting fuel into the upwardly rising air/meal stream at a point within said vessel downstream from entrance of said meal and burning said fuel with said combustion air to calcine said meal, whereby the endothermic reaction of calcining said cement meal limits temperature rise within said vessel resulting from burning said fuel with said combustion air, and decreasing the velocity of the upwardly swirling combustion air/meal stream at a point downstream from injection of fuel to thereby increase the residence time thereof within said vessel for calcination of said meal.

20. A heat treating method in accordance with claim 19 and including the step of introducing hot waste gases from said kiln into said vessel at a point downstream from injection of said fuel and where substantially complete calcination of said cement meal has occurred to mix said kiln waste gases with, and transfer the heat energy thereof to, the calcined meal/air stream within said vessel without retardation of calcination which would otherwise be caused by carbon dioxide in said kiln waste gases.

21. A heat treating method in accordance with claim 20 and including the step of selectively controlling the amount of hot waste gases from said kiln introduced into said vessel.

22. A method of heat treating cement raw meal in a calcining combustor vessel of a rotary kiln cement plant having a cooler for clinker from the kiln comprising, feeding combustion air from said cooler into said vessel which is not admixed with waste gases from the kiln adjacent one end thereof and simultaneously withdrawing gas in an outwardly spiraling direction from adjacent the other and of said vessel to create swirling flow of said combination air through said vessel, feeding cement meal into the combustion air stream within said vessel at a point downstream from entrance of combustion air, injecting fuel into the meal/air stream at a point within said vessel downstream from meal entrance and burning said fuel with said combustion air to calcine said meal, whereby the endothermic reaction of calcining said cement meal limits temperature rise within said vessel resulting from burning said fuel with said combustion air, decreasing the velocity of the swirling combustion air/meal stream at a point downstream from fuel injection to therby increase the residence time thereof within said vessel for calcination of said meal, and introducing hot waste gases from said kiln into said vessel at a point downstream from injection of said fuel and where substantially complete calcination of said meal has occurred to mix said kiln gases with, and transfer the heat energy thereof to, the calcined meal/gas stream within said vessel without retardation of calcination which would otherwise be caused by carbon dioxide in said kiln gases.

* * * * *

UNITED STATES PATENT OFFICE
CERTIFICATE OF CORRECTION

Patent No. 4,372,784    Dated February 8, 1983

Inventor(s) Paul D. Hess

It is certified that error appears in the above-identified patent and that said Letters Patent are hereby corrected as shown below:

In the title on the cover sheet and in column 1, line 2, after "Material" insert --- and ---;

Column 10, line 21, claim "5" should read --- 3 ---;

Signed and Sealed this

Twenty-eighth Day of June 1983

[SEAL]

Attest:

GERALD J. MOSSINGHOFF

Attesting Officer    Commissioner of Patents and Trademarks